United States Patent [19]

Andréasson

[11] Patent Number: 4,682,249
[45] Date of Patent: Jul. 21, 1987

[54] METHOD OF DOCUMENTATING AN INVENTORY, AND A SEALING MECHANISM FOR USE THEREWITH

[76] Inventor: Kurt Andréasson, Postlåda 973, Bollebygd, Sweden, 51700

[21] Appl. No.: 724,414

[22] Filed: Apr. 18, 1985

[30] Foreign Application Priority Data

Apr. 19, 1984 [SE] Sweden ................................ 8402203

[51] Int. Cl.⁴ ...................... H04N 5/782; G11B 33/00
[52] U.S. Cl. ..................................... 360/33.1; 360/60
[58] Field of Search ................ 360/60, 128, 132, 33.1; 358/335; 242/198, 199

[56] References Cited

U.S. PATENT DOCUMENTS

4,320,422  3/1982  Rinkleib ................................ 360/60

*Primary Examiner*—Donald McElheny, Jr.
*Attorney, Agent, or Firm*—Wegner & Bretschneider

[57] ABSTRACT

When recording an inventory, a video-camera having a microphone and optics making possible total views, as well as detail views on a larger scale of the individual objects is used. When the recording is terminated the cassette is sealed by means of a cylindrical body introduceable in a cylindrical passage in the cassette casing, the body being provided with at least one extending lip engaging an opening in the side wall defining the passage. The mechanism includes at least two portions interconnected by a fractural impression so located that a fitted mechanism cannot be removed until the two portions have been separated. An arm directed sidewardly from the body may carry a member at its distal end adapted to lock the lid of the cassette. Alternatively the cassette is placed in a cover of radiation impervious material, which is sealed together with the cassette.

13 Claims, 17 Drawing Figures

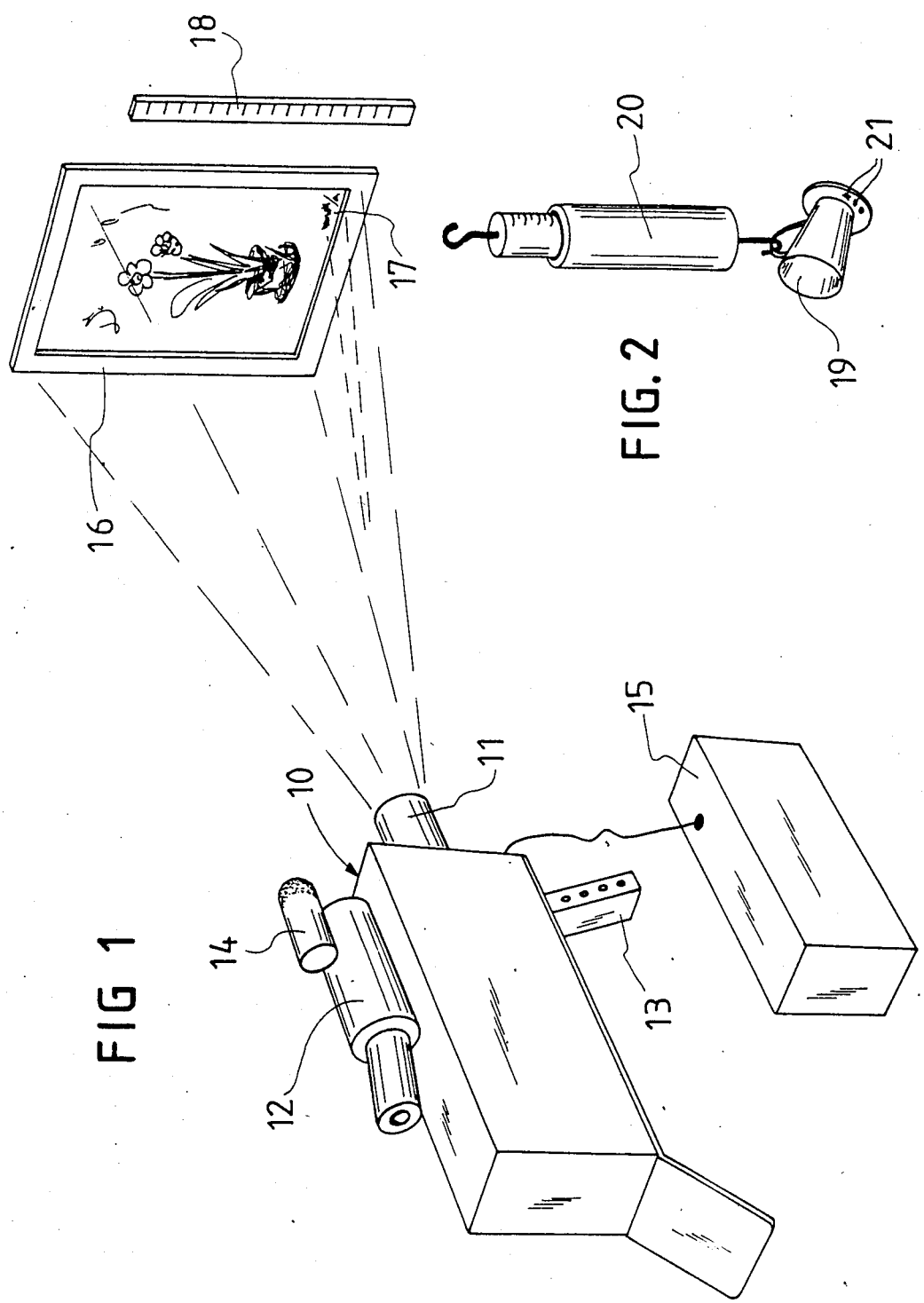

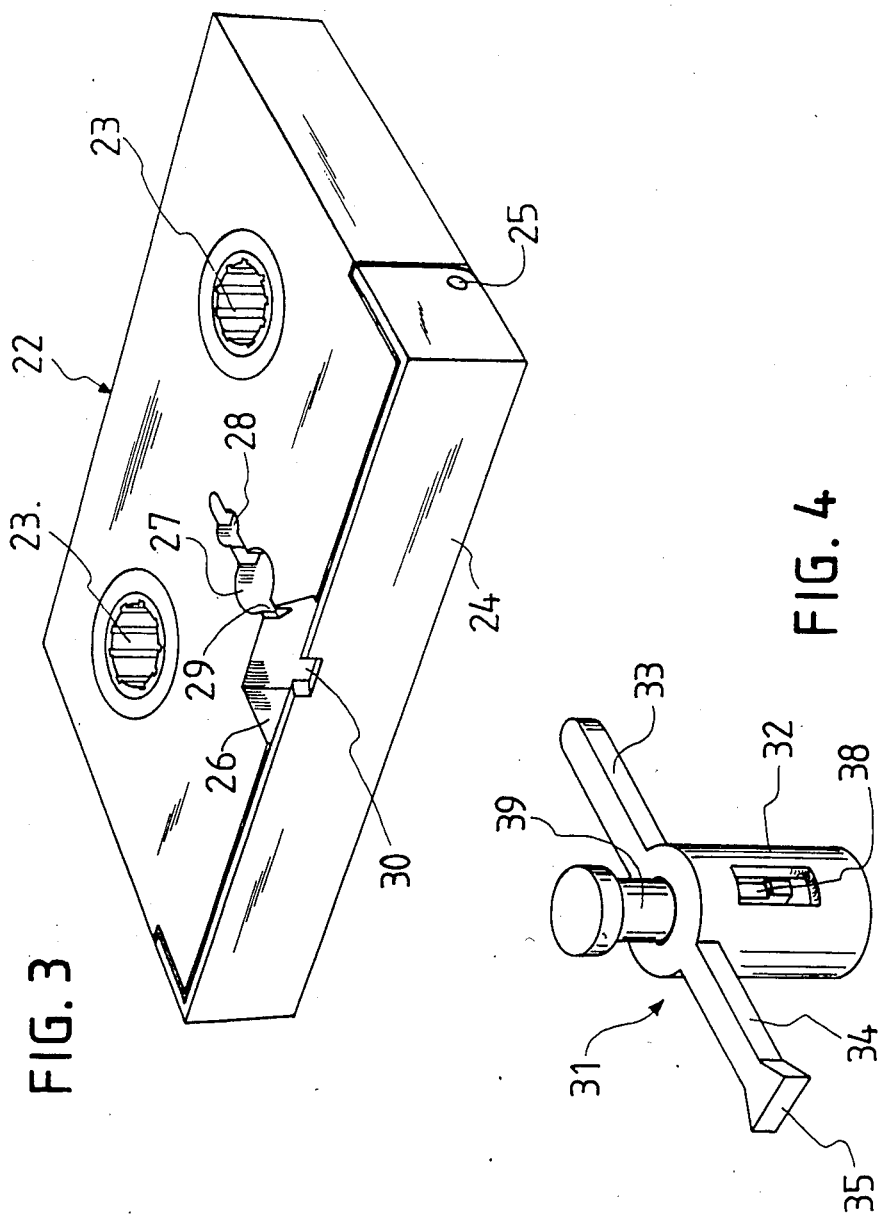

METHOD OF DOCUMENTATING AN INVENTORY, AND A SEALING MECHANISM FOR USE THEREWITH

BACKGROUND OF THE INVENTION

After a fire or a burglary those who have suffered will have to list their losses and together with the insurance people establish the value thereof.

Experience from such discussions show that it is difficult for the insured party to remember every item lost, and furthermore to make the parties agree about the value of the lost equipment.

Inventories prepared in advance, possibly augmented by photos, will of course be useful, but will seldom offer a complete and righteous picture of the total scope, and the value of the equipment.

By using a video-camera with picture and sound recording properties it is possible to document, room by room in a housing unit, a total view of each room, as well as individual objects therein.

SUMMARY OF THE INVENTION

A method of documenting an inventory, is according to the present invention characterized in using a video-camera operating a sound registering cassette and provided with conventional optics, as well as macro-zoom-equipment, for accounting total views as well as details of individual objects, while simultaneously orally describing the latter and/or specially characteristic features thereof.

It is of course important that the cassette, after a possible control of picture and sound quality, is efficiently sealed.

A sealing mechanism for a video cassette of standard type where the casing is provided with a cylindrical passage having at least one opening in its envelope wall preferably is characterized in a body adapted for introduction into the cylindrical passage and provided with at least one projecting lip for engagement with said opening, the mechanism further including at least two portions interconnected by a fractural indication so located that a removal of a fitted mechanism is impossible until the two portions have been separated.

In a cassette having a swingable lid the sealing mechanism preferably includes at lesat one arm extending sidewardly from the body and carrying a member for gripping the lid of the cassette.

The body is advantageously hollow and encloses an axially displaceable piston adapted to force the lip, or lips into engagement, the piston being provided with a shaft carrying a washer holding the piston when brought to engaging position, the connection between the shaft and the washer being provided with a fractural indication.

Each lip is preferably provided with a catch and a juxtaposed locking edge, a cam at the piston being outwardly defined by a catching member adapted to snap in behind the locking edge of the lip, when the latter has been depressed. The sidewardly directed arm may include a guide integral with the body and a slide, displaceable along the guide, and carrying the member engaging the lid of the cassette, the piston and the shaft being formed with at least one oblique guiding way, adapted to pull the slide towards the body during the depressing of the piston.

In a modified version the mechanism may include a semi-cylindrical shell body mounted upon a washer, and having at each of its longitudinal edges a projecting lip connected to the body by a fractural indication, the washer, at its face remote from the body having a portion adapted to receive a tool for rotating the mechanism, when the seal is to be broken.

BRIEF DESCRIPTION OF THE DRAWINGS

FIG. 1 schematically shows the equipment and the method of documenting an object, FIG. 2 shows an alternative method of documenting an object, FIG. 3 shows a video cassette of standard type, FIG. 4 schematically shows one sealing mechanism for a cassette.

DESCRIPTION OF SOME PREFERRED EMBODIMENTS

Figure 6:
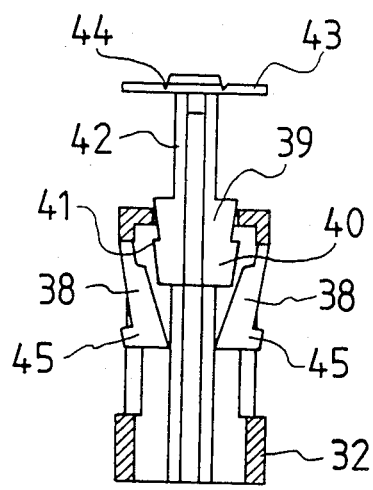
FIG. 6 shows a vertical section through the central body of the sealing mechanism.

For the documenting a portable video-camera of high quality, and equipped with a sound recorder, and other conventional equipment is used. The camera ought to have wide-angle lens, macro-optics and zoom-equipment.

When documenting the inventory of a house, it can be advantageous to start exteriorly, and especially note the lock at the entrance door and also other spots, which may be of interest to a burglar.

Then the interior is documented room by room, the camera being made to sweep along the walls, so every piece of equipment is noted. Cupboards and wardrobes are filmed with their doors opened.

Thereafter the individual items are filmed. A painting may be filmed from a distance of about 1.5 m so the details thereof will be clearly discernable. In a following step the signature of the painting is zoomed-in, without the camera leaving the painting. Hereby it will be possible to show that the signature really "belongs" to the painting in question, and is not transferred from some other painting.

Other valuable durables, such as items of china, pewter, silver or gold are recorded in detailed, including possible hall marks on a larger scale. The dimensions and the weight are also stated, whenever applicable.

FIG. 1 shows, very schematically a portable equipment for documenting. Reference 10 denotes a video-camera of arbitrary known type, provided with optics 11 and view finder 12. The optics includes wide-angle lens, macro-optics and zoom-equipment, and is operable from a handle 13 with a push-button panel.

The camera is provided with a micro-phone 14 and is connectable to a carrier 15 containing recording cassette and batteries, possibly also a cable for connection to the electric main.

In the example shown the camera is used for recording a painting 16, wherein, at first, a total view is obtained and then the signature 17 is zoomed-in. Advantageously a ruler 18, for instance a bar having a length of one meter, is initially located adjacent to the painting.

During the recording the camera operator, or the owner of the equipment, tells about the items being recorded, so an oral description is obtained simultaneously with the picture.

FIG. 2 shows an alternative way of documenting an item 19 of precious metal, which is hung in an assay balance 20, so the weight and the item are recorded simultaneously. Finally the hall-marks 21 are recorded on a larger scale.

Different kinds of equipment will require different treatment, but irrespective of the pieces involved consisting of furniture, weapons, Oriental rugs, furs and so on, it is interesting to note the total appearance as well as one or more characteristic features, on a larger scale.

Of further interest is of course the guarantee that the recording is not amended until for instance a damage has to be discussed. To that end an efficient sealing of the cassette after the recording is desirable, possibly after a control of the quality of pictures and sound.

FIG. 3 shows a video casette 22 of standard type, turned with its bottom upwards. The drive fittings for the tape reels are denoted by 23, and a swingable lid protecting the tape is denoted by 24. The lid is swingable about pivots 25.

In the casing of the cassette there is a bigger void 26 into which guiding arms of the video tape are introduced, when the cassette is mounted for use. There is furthermore a substantially cylindrical passage 27, into which a light bulb is introduced. Behind the passage 27 there is a smaller opening 28 for an attachment screw. The void 26, the passage 27 and the opening 28 communicate by way of a groove 29 in the side wall of the cassette.

In the edge of the lid 24, which is turned upwardly in the drawing, there is a dove-tail recess 30, aligned with groove 29.

The envelope wall of passage 27 is conventionally provided with two openings located diametrically opposite to each other, for permitting rays or light to be directed towards the tape. This makes it possible to design a locking cylinder, which fits into the passage 27, and makes it impossible to mount the cassette in a playback machine, until the cylinder has been removed.

Such an arrangement will however leave the lid unlocked, and offers some possibility of manipulating the tape.

A simple sealing mechanism 31 is shown in FIG. 4. It includes a cylindrical body 32 mating with the passage 27, and provided with two arms 33, 34 directed outwards, diametrically opposite to each other and adapted to be fitted into groove 29. The arm 34, which when in use is directed towards the lid 24 is at its distal end provided with a dove-tail head 35, which fits into the recess 30 in the lid.

Figure 5:
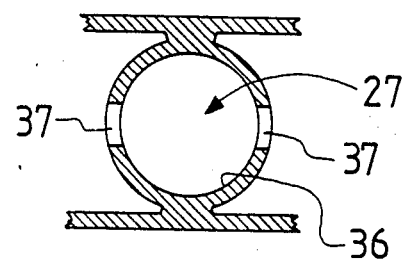
FIG. 5 shows a horizontal section through the passage in the cassette casing.

As evident from FIG. 5, the cylindrical envelope wall 36 defining the passage 27, is provided with two light openings 37. Those are here used for locking the sealing body 32 in the passage.

The body is provided with lips 38, which are swung out when a button 39 is pressed downwards, and will then engage the upward edges defining the light openings 37.

Figure 7:
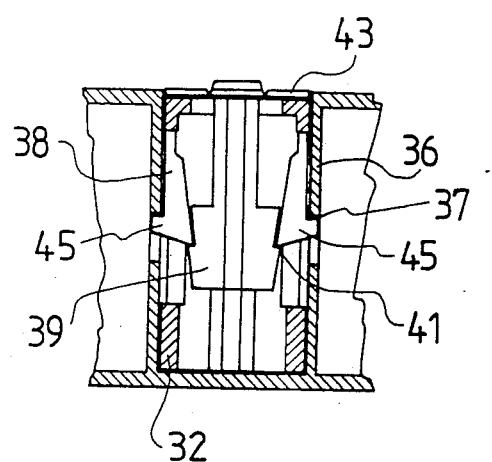
FIG. 7 shows a sealing mechanism positioned in the passage in the cassette.
Figure 8:
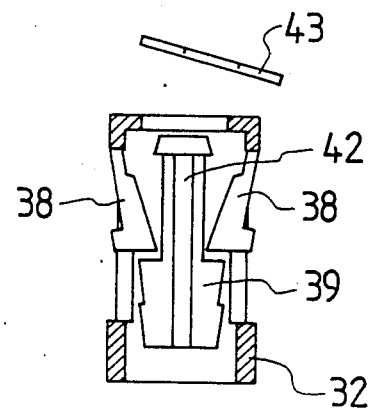
FIG. 8 shows how the seal is broken, when the content of the cassette is going to be viewed.

FIG. 4 does only describe the basic requirements, a preferred embodiment of the central body being shown in FIGS. 6-8.

The piston 39 is here provided with cams 40, which are provided with catching members 41, suited to engage the lips 38. The piston further has an elongate shaft 42, which is terminated by a washer 43. The latter has a circular groove 44 around the shaft, serving as a fractural indication.

FIG. 6 shows the body 32 with the piston 39 in withdrawn position. The shape of the lips 38 is best shown in this figure. Each lip is provided with a strong catch 45, adapted to be introduced in either of the openings 37 in the wall of the passage 37, engaging the upward edge of the opening. The back of the catch is formed as a sharp edge adapted to cooperate with the catching member 41 at the associated cam at the piston 39.

FIG. 7 shows the sealing position, i.e. the piston 39 has been pushed inwards, so the catches 45 of the lids have been forced into the openings 37, and the catching members 41 have locked the lips and the piston, so the body 32 cannot be withdrawn. It should be noted that the length of the body 32 is that much less than the depth of the passage 27, as to permit the washer 43 to fit into the mouth of the passage and fully cover the same, without piston 39 reaching down to the bottom of the passage.

In order to play the tape it is necessary to break the seal, which is done by pushing the piston further down. The connection between the washer 43, and the shaft will then break, and the piston 39 can move so far downwards that the lips 38 will spring back, above the latter. Thereafter the body 32 can be retracted from the passage.

Figure 9:
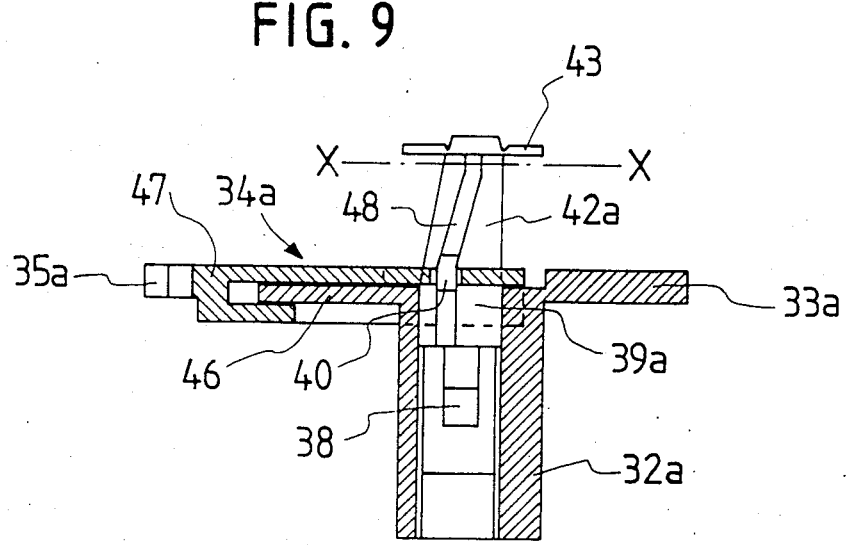
FIG. 9 shows a vertical section through a modified design of the sealing mechanism.
Figure 10:
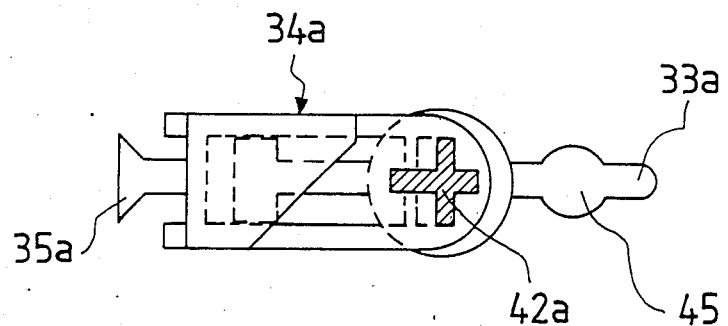
FIG. 10 shows a plan view of the mechanism just below the shaft washer.
Figure 11:
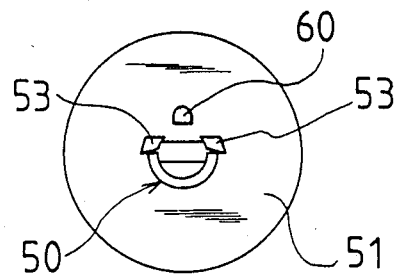
FIGS. 11–15 show various views of a modified embodiment of the sealing mechanism.
Figure 12:
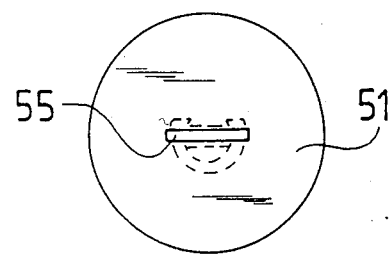
Figure 13:
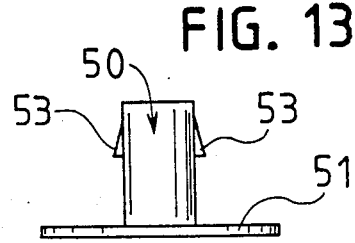
Figure 14:
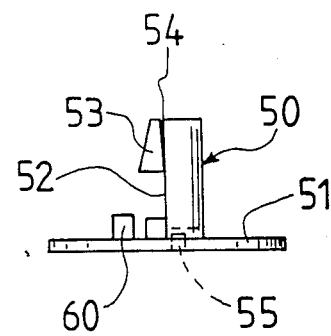
Figure 15:
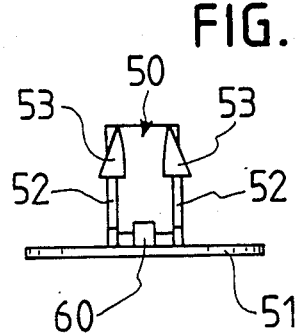

In order to obtain an improved locking of the lid 24 a modified version of the sealing mechanism, shown in FIGS. 9 and 10, may be used. The central body 32a with its lips 38 operates in the manner described in conjunction with FIGS. 6-8.

The inwardly directed arm 33a is provided with an enlargement 45, which fits into the opening 28 in the casing of the cassette. Therefore, the sealing mechanism will be further securely held.

The arm 34a directed towards the lid comprises a fixed guide 46, and a slide 47, reciprocable therein, and carrying the dove-tailed portion 35a intended to engage the lid.

The piston 39a and the shaft 42a here have a cruciform cross section. The wings of the cores will form guides in the body, and two of the wings have cams 40. One of the wings, 48, is formed as an oblique guiding way, passing through a corresponding groove in the slide 47. When the piston and the shaft are pushed inwards the oblique guiding way will pull the slide 47 inwards. Hereby securely locking the lid 24.

The embodiments above described and shown in the drawings should be regarded as examples of the invention only, the details of which may be modified in many ways within the scope if the appended claims.

The system may be used with different kinds of basic equipment, such as VHS, BETA, VCR and others.

FIGS. 11-15 show a modified embodiment of the sealing mechanism. This includes a semi-cylindrical shell body 50 integral with a washer 51, the body being dimensioned to fit into the passage 27 in the cassette. At each of the axial edges 52 of the body 50 there is a protruding lip 53, joined to the edge by a fractural indication 54. The lips are resilient, and located so they will fit into the openings 37 in the envelope wall of the passage 27 when the body is pushed thereinto.

Adjacent to the body 50, the washer carries a projection 60, which will fit into the groove 29 in the cassette thereby locating the lips 53 properly in relation to the openings 37.

At the face of the washer 51, remote from the body 50, there is a slot 55, suited to receive a screw driver, or some similar tool for rotating the mechanism when it is desirable to break the seal.

When the body 50 is rotated in relation to the passage, into which it has been fitted, the lips 53 are shorn off at the fractural indications 54, whereafter the mechanism may be removed.

Figure 16:
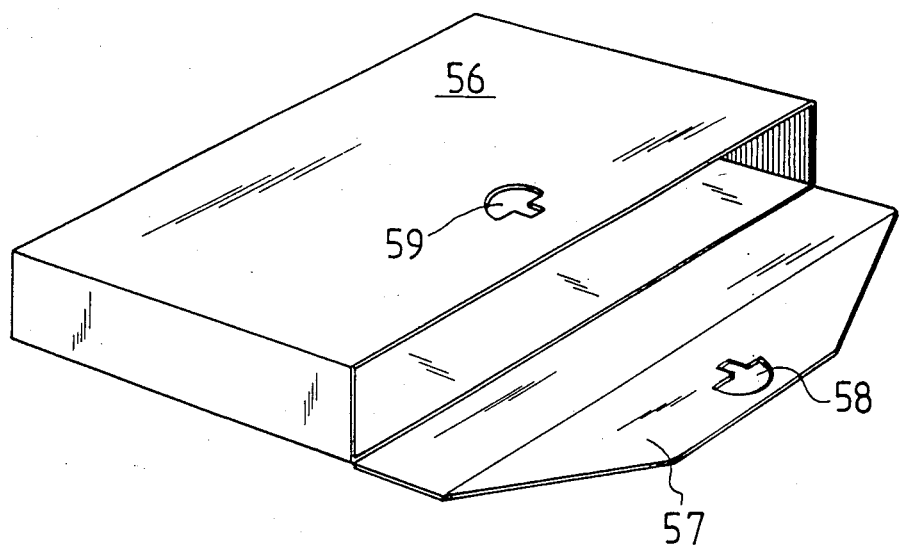
FIG. 16 shows an empty cover for a cassette.
Figure 17:
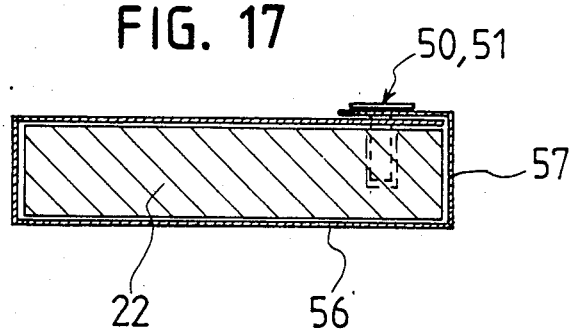
FIG. 17 shows a cross section through cassette and cover sealed with a mechanism according to FIGS. 11–15.

The recording upon the tape may be damaged if the cassette, inadvertently or intentionally, is subjected to radiation. In order to protect the recording the cassette is advantageously put into a cover of radiation impervious material, for instance of the type shown in FIGS. 16 and 17.

The cover 56 has a flap 57 which will fully enclose the cassette 22. There are openings 58, 59 in the flap and in one side wall of the cover, which permit the introduction of a sealing mechanism 50, 51 according to FIGS. 11–15. This will thus lock the cassette as well as the cover.

In a simpler embodiment the cover may lock the flap 57. In such case the cassette is introduced with its lid side first, and the opening 59 is located adjacent to the closed longitudinal side of the cover.

The sealing mechanism can be designed in various ways to suit the shape of the cassette, and may be used also with mini cassettes. The sealing mechanisms are preferably numbered, which makes it easy to list the proprietor, the insurance company and the time of recording of each recording. In more important cases it will of course be possible to put a wax seal, or the like, on top of the washer 43 in FIG. 7, or some other body located in the passage, to establish that the sealing has not been manipulated.

While the invention has been particularly shown and described in reference to preferred embodiments thereof, it will be understood by those skilled in the art that changes in form and details may be made without departing from the spirit and scope of the invention.

What I claim is:

1. A sealing mechanism to prevent tampering for a magnetic tape cassette of the type wherein a casing is provided with a cylindrical passage having at least one opening in its envelope wall, said mechanism, comprising:
   a body adapted for introduction into said cylindrical passage and having at least one projecting lip for engagement with said envelope wall of said opening;
   protruding members interconnected by a fragile portion to said body so located that a removal of a fitted mechanism is impossible until said protruding members have been separated; and
   at least one arm extending sidewardly from said body and a member means for gripping a lid of said cassette.

2. A sealing mechanism according to claim 1, wherein said body is hollow and encloses an axially displaceable piston means for forcing said at least one lip into engagement, and wherein said piston has a shaft carrying a washer means for holding said piston when brought to an engaging position, the connection between said shaft and said washer means is formed by said fragile portion.

3. A sealing mechanism according to claim 1, wherein said at least one lip has a catch and a locking edge, and wherein a cam at a piston displaceable in said body being outwardly defined by a catching member means for snapping in behind said locking edge of said lip when said lip has been depressed.

4. A sealing mechanism according to claim 1, wherein said body is hollow and encloses an axially displaceable piston means for forcing said at least one lip into engagement, and wherein said body has an arm extending sidewardly from said body and carrying a member means for gripping a lid at said cassette, said arm comprises a guide integral with said body and a slide displaceable along said guide and carrying said lid-engaging member, said piston is formed with at least one oblique guiding way for pulling said slide towards said body during the introduction of said piston into said passage.

5. A sealing mechanism according to claim 1, wherein said body is substantially a semi-cylindrical shell mounted upon a washer, and having at each of its longitudinal edges a projecting lip connected to said body by an impression, and wherein said washer at its face remote from the body has a portion means for receiving a tool for rotating said sealing mechanism when said mechanism is to be broken.

6. A sealing mechanism to prevent tampering for a magnetic tape cassette according to claim 1, wherein said magnetic tape cassette is a videotape cassette.

7. A method of sealing a magnetic tape cassette to prevent tampering, comprising the steps of:
   providing a mating passageway through a casing of said cassette;
   engaging a substantially elongated member into said mating passageway;
   locking a lid member of said cassette with said elongated member, and thereafter
   sealing said cassette.

8. A method according to claim 7, comprising fitting the cassette in a radiation immpervious cover and sealing the same together with the cassette.

9. A method of sealing a magnetic tape cassette according to claim 7, wherein said magnetic tape cassette is a video tape cassette.

10. A method of sealing a magnetic tape cassette according to claim 7, further including the steps of:
    introducing a substantially cylindrical member into said mating passageway in said cassette; and
    providing at least one lip suitable for being introduced in an opening in an envelope wall of said passageway, and wherein said step of providing at least one lip includes the step of providing portions interconnected by a fragile portion so located that a removal of a fitted cylindrical member is impossible until said fragile portion has been separated.

11. A method of sealing a magnetic tape cassette according to claim 10 wherein the step of locking a lid member comprises the steps of:
    providing a groove in said lid member;
    connecting at least one arm member to said cylindrical member;
    accommodating said arm member into said groove; and thereafter engaging said arm member into said lid member.

12. A method of sealing a magnetic tape cassette according to claim 11 wherein the step of providing at least one arm member to said cylindrical member further comprises the step of providing a dove-tail head for its distant end.

13. A method of documenting an inventory of objects, comprising the steps of:
- operating a video-camera with a second registering cassette, conventional optics, and macro-zoom equipment;
- orally describing the latter or specially characteristic features thereof;
- removing said cassette from said video camera;
- fitting said cassette into a radiation impervious cover having at least one aperture passing therethrough which is directly above a cassette passage means;
- inserting an elongated member having at least one substantially resilient protruding lip member and at least one fixed member into said cassette passage means;
- accommodating said fixed member of said elongated member into a groove of a cassette lid;
- latching the cassette lid with said fixed member;
- engaging said substantially resilient protruding lip member onto said portions of said cassette passage means; and thereafter
- sealing said radiation impervious cover together wtih said cassette.

* * * * *

UNITED STATES PATENT AND TRADEMARK OFFICE
CERTIFICATE OF CORRECTION

PATENT NO. : 4,682,249
DATED : July 21, 1987
INVENTOR(S) : Kurt ANDREASSON

It is certified that error appears in the above-identified patent and that said Letters Patent is hereby corrected as shown below:

On the title page, after the inventor's name and address, insert the following:

--[73] Assignee: Video-Proof AB, Sweden--

Signed and Sealed this

Second Day of February, 1988

Attest:

DONALD J. QUIGG

Attesting Officer

Commissioner of Patents and Trademarks